United States Patent
Honda

(10) Patent No.: US 6,750,942 B2
(45) Date of Patent: Jun. 15, 2004

(54) MOTION PICTURE CODE EVALUATION APPARATUS AND SYSTEM

(75) Inventor: Yoshizou Honda, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 123 days.

(21) Appl. No.: 10/084,025

(22) Filed: Feb. 25, 2002

(65) Prior Publication Data

US 2002/0126258 A1 Sep. 12, 2002

(30) Foreign Application Priority Data

Feb. 26, 2001 (JP) .................................. P.2001-049544

(51) Int. Cl.[7] .............................................. G03B 21/50
(52) U.S. Cl. ........................................ 352/92; 396/210
(58) Field of Search ........................... 392/92; 396/210, 396/310, 315

(56) References Cited

U.S. PATENT DOCUMENTS 6,556,273 B1 * 4/2003 Wheeler et al. ............... 352/92

OTHER PUBLICATIONS

U.S. patent application Ser. No. 09/577,096, filed May 24, 2000.
U.S. patent application Ser. No. 10/032,237, filed Dec. 21, 2001.

* cited by examiner

Primary Examiner—Michael Adams
Assistant Examiner—Michael Dalakis
(74) Attorney, Agent, or Firm—Fish & Richardson P.C.

(57) ABSTRACT

A motion picture code evaluation apparatus for evaluating an amount of motion picture information after transmission, the apparatus has a header inspection unit for inspecting a frame header and determining that whether the frame header is abnormal or not to calculate frame loss ratio every predetermined time, an extracting unit for extracting motion picture coding parameter from the frame header and detecting variation of the motion picture coding parameter in the predetermined time, and an amount-of-motion-picture-information calculating unit for summing the motion picture coding parameter and weight, which is based on the variation of the motion picture coding parameter, to calculate an ideal amount of motion picture information every predetermined time, in which an actual amount of motion picture information is calculated by multiplying the ideal amount of motion picture information by (1–the frame loss ratio).

7 Claims, 1 Drawing Sheet

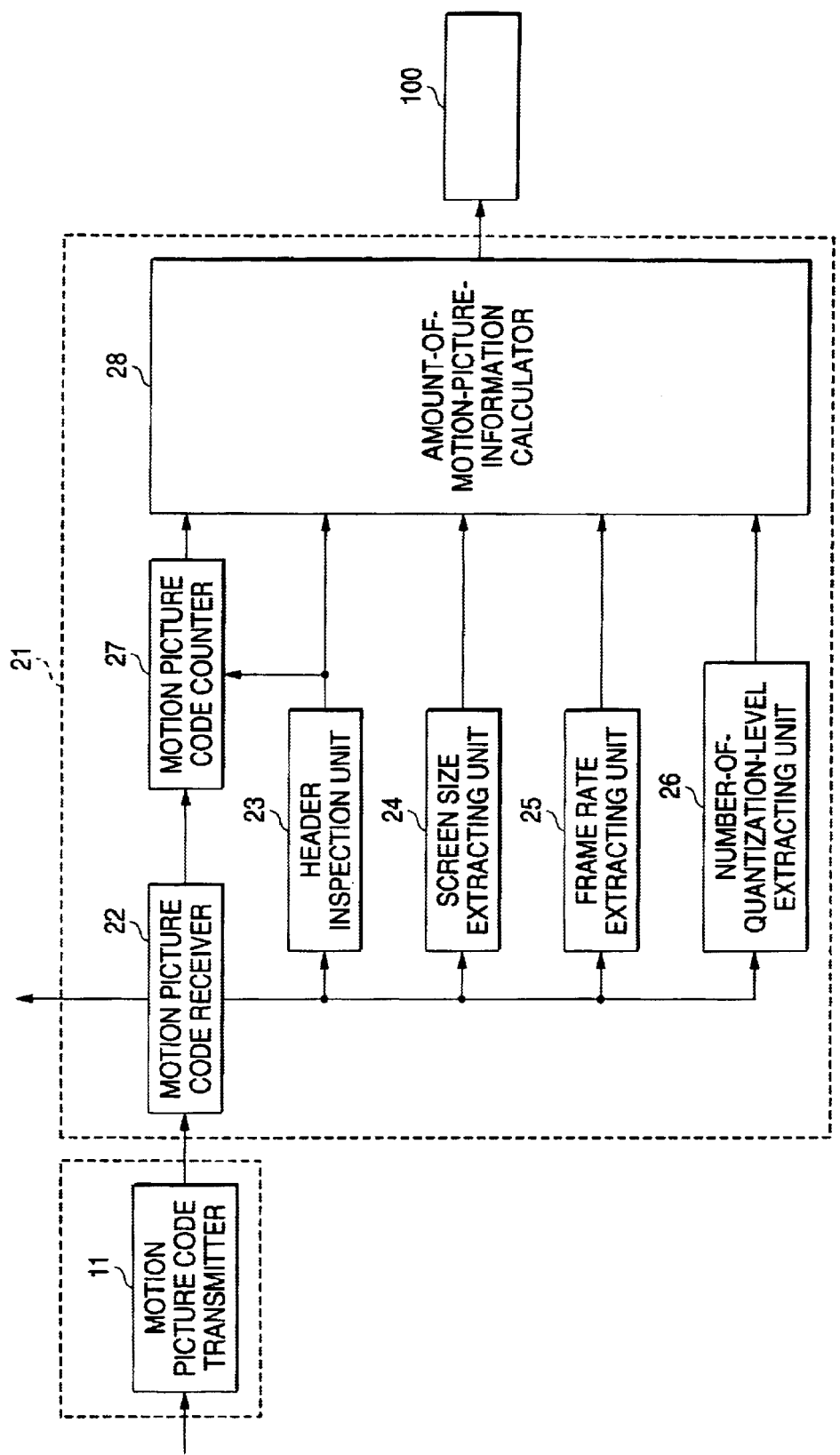

MOTION PICTURE CODE EVALUATION APPARATUS AND SYSTEM

The present disclosure relates to the subject matter contained in Japanese Patent Application No. 2001-49544 filed on Feb. 26, 2001 and Japanese Patent Application No. 2002-39545 filed on Feb. 18, 2002, which are incorporated herein by reference in its entirety.

BACKGROUND OF THE INVENTION

1. Field of the Invention

The present invention relates to a motion picture code evaluation apparatus and in particular to a motion picture code communications evaluation technology to evaluate a code and a protocol used for transmission/reception of digital motion picture data.

2. Description of the Related Art

The digital motion picture is a temporal link of instantaneous pictures called motion frames (hereinafter referred to as frames). The digital motion picture generally has enormous data amount. Therefore, generally, compression of information, that is, encoding is made to perform data transmission/reception and the received data is decoded to play back the motion picture.

For example, international standards of the motion picture codes include MPEG (Moving Picture Experts Group)—2 (ISO/IEC13818) and MPEG-4 (ISO/IEC14496) by the ISO/IEC (International Organization for Standardization/International Electrotechnical Commission) and H.261 and H.263 by the ITU (International Telecommunication Union) recommendations.

The aforementioned motion picture code comprises pixels arranged in a shape of a lattice. For example, the CIF format comprising 352 horizontal pixels by 288 vertical pixels and the QCIF format comprising 176 horizontal pixels and 144 vertical pixels are used.

The number of pixels composing a frame is also called the screen size.

In the case of a color picture, for example, in the CIF, the number of pixels includes a luminance screen (Y information) and two chrominance screens (U and V information) There are, for example, 4:2:0 format where one pixel is assigned to the U information of the chrominace screens and one pixel is assigned to the V information of the chrominance screens per the luminance screen having 2 by 2 pixels, 4:2:2 format where one pixel is assigned to the U information the chrominance screens and one pixel is assigned to the V information the chrominance screens per the luminance screen having 2 pixels, and the like.

The 4:2:2 format has twice the number of the pixels in the chrominance screens as many as the 4:2:0 format.

In some case, three primary colors such as RGB (red, green, blue) may be used to represent each of pixels.

In the case of color image, the number of pixels refers to all pixels of the luminance and the chrominance or the three primary colors.

It goes without saying that the more the number of pixels per frame are, the more minute, that is, the higher quality picture is obtained.

The number of frames per unit time is, for example, 30 frames per second or 15 frames per second. The greater this value is, the smoother action is represented, that is, the higher quality picture is obtained.

In digitally representing the brightness, the intermediate gradation levels are quantized from the darkest black to the brightest white.

In such a case, the number of the quantization levels are finite and around 256 levels of gray gradation that can be visually represented in eight bits are used in general applications.

Or, the number of colors represented digitally is finite and around 16 million colors are used.

The number of colors may be referred to as the number of quantization levels.

Unless there is particular reason, the number of quantization levels is the number of colors in the case of color image.

Also, the number of gray quantization levels is greater, the higher quality picture is obtained.

The value obtained by totaling the gray quantization levels in a specific time over all the pixels in the frames is called a motion picture information amount.

Generally, the number of pixels and the number of frames per second are constant but may change the number of pixels or frames.

The number of quantization levels may vary within a frame.

For load applied on a transmission path, a transmitter and a receiver, the smaller amount of motion code provides smaller load.

Thus, an amount of motion picture codes in relation to an amount of an image before information compression, that is, the higher compression ratio or the more coding efficiency is desirable.

For motion codes specified in the international standards or equivalent, the realized encoding efficiency is limited. In order to reduce the load on a transmission path, a transmitter and a receiver, it is practically efficient to reduce the number of pixels, frames and gray quantization levels actually. However, this degrades the picture quality.

An actual operation for compensating the load on a transmission path, a transmitter and a receiver in the transmission of motion pictures requires high cost so that services may be operated by setting the higher charge for the larger amount of motion picture information.

Quality degradation of motion pictures caused by transmission of a motion picture code will be described.

In transmission/reception of a motion picture code, a motion picture received at a receiving party suffers from degradation compared with an original motion picture due to the following causes:

Firstly, a motion picture code is not correctly received due to a transmission error.

Secondly, transmission in packets results in loss of some of the packets halfway and the lost packets are not received.

Thirdly, transmission/reception of a motion picture code takes too much time and displaying after decoding of a motion picture frame is delayed from the timing of regeneration of motion picture, which already have started, so that the display of the motion picture frame is skipped and execution proceeds to processing of the next motion picture frame.

A part of an original motion picture, which is failed to be decoded and be displayed, is referred to a motion picture loss.

Depending on which part of the motion picture code the error occurred in, the transmission error has different influences on the motion picture to be decoded and to be displayed.

A parameter representing specifications of the entire motion picture code such as the screen size, and the chrominance format of a motion picture code or a part of the motion picture code that accommodates codes related to the predictive encoding system for the entire frame and prediction method is referred to a header.

In case that a transmission error has occurred in the header section, decoded display of the entire motion picture is disabled or decoded display of the entire frame is disabled.

In case that a transmission error has occurred in the section related to the gradation of pixels in a frame, decoded display of only corresponding pixels may be disabled.

In this way, there are not a specific relationship between the amount of motion picture code not used for decoded display due to a transmission error or delay and the amount of motion picture loss in a motion picture after decoding. Thus it is necessary to evaluate the motion picture loss in each time.

Assume that a motion picture code is transmitted in the CIF format at present and a service is performed to change to the transmission of a motion picture in QCIF format in accordance with congestion of a transmission path and worsening of transmission error ratio. In this case, the quality of a motion picture is roughly classified into two stages.

The CIF and QCIF formats have 352 horizontal pixels by 288 vertical pixels and 176 horizontal pixels by 144 vertical pixels, respectively. Therefore, difference in the amount of motion picture information between the CIF and QCIF formats is four times.

When several percents of motion picture loss is caused due to the transmission error, the difference in the amount of motion picture information between the CIF and QCIF formats is in a range of 3.8 to 4.2 times.

Even if charging is made in proportion to an amount of correctly transmitted motion picture information, the number of pixels and the number of frames (in other words, which format the motion picture is transmitted in) greatly influence on the amount of correctly transmitted motion picture information and the several percents of motion picture loss has one tenth as influence on the amount of correctly transmitted motion picture information as the difference between the formats as described above.

A motion picture code evaluation apparatus according to the related art decodes a received motion picture code to determine the motion picture loss. Therefore, even if one frame has fifty thousand pixels, the apparatus calculates the amount of motion picture loss in accuracy of 0.0002 percent.

However, as mentioned earlier, since the motion picture loss does not greatly influence on the amount of the motion picture information, it is sufficient to obtain the amount of the motion picture loss in an accuracy of several percents. Therefore, the processing scale to decode all the pixels to determine the motion picture loss is an excessive load on the receiver.

In a situation where progress in transmission technologies are eminent, transmission capacity is ever-increasing and motion picture code rate is getting higher, it is quite important to reduce the processing load especially on the receiver.

An object of the invention is to provide a motion picture code evaluation apparatus which detects that whether frame header of motion picture code is abnormal or not and extracts motion picture coding parameter included in the frame header, and thereby being able to evaluate the motion picture loss without decoding the motion picture code and can reduce the processing load.

SUMMARY OF THE INVENTION

According to a first aspect of the invention, there is provided a motion picture code evaluation apparatus for evaluating an amount of motion picture information after transmission, the apparatus comprising:
  a header inspection unit for inspecting a frame header and determining that whether the frame header is abnormal or not to calculate frame loss ratio every predetermined time;
  an extracting unit for extracting motion picture coding parameter from the frame header and detecting variation of the motion picture coding parameter in the predetermined time; and
  an amount-of-motion-picture-information calculating unit for summing the motion picture coding parameter and weight, which is based on the variation of the motion picture coding parameter, to calculate an ideal amount of motion picture information every predetermined time,
  wherein an actual amount of motion picture information is calculated by multiplying the ideal amount of motion picture information by (1−the frame loss ratio).

According to a second aspect of the invention, there is provided the apparatus according to the first aspect of the invention,
  wherein the motion picture coding parameter includes number of pixels of motion picture, frame rate, and number of quantization levels; and
  wherein the extracting unit detects a ratio of frames in which each of the number of pixels, the frame rate, and the number of quantization levels continues to have the same value to the predetermined time.

According to a third aspect of the invention, there is provided the apparatus according to the second aspect of the invention,
  wherein the number of pixels, the frame rate, and the number of quantization levels, which are included in the frame header determined abnormal, are ignored; and
  wherein the number of pixels, the frame rate, and the number of quantization levels, which are included in the frame header just before the abnormal frame header, are assumed to continue.

According to a fourth aspect of the invention, there is provided the apparatus according to any one of the second and third aspects of the invention,
  wherein the number of quantization levels is extracted while the number of quantization levels included in a header belonging to a lower layer than the frame is taken into consideration in addition to the number of quantization levels included in the frame header.

According to a fifth aspect of the invention, there is provided the apparatus according to any one of first to fourth aspects of the invention, wherein the extracting unit has one of timer and counter, which is reset when the extracting unit extracts the parameter different from the parameter included in the immediately preceding frame header.

According to a sixth aspect of the invention, there is provided a motion picture transmission network system comprising:
  a motion picture code evaluation apparatus for evaluating an amount of motion picture information after transmission, the apparatus comprising:
    a header inspection unit for inspecting a header and determining that whether the frame header is abnormal or not to calculate frame loss ratio every predetermined time;
    an extracting unit for extracting motion picture coding parameter from the frame header and detecting variation of the motion picture coding parameter in the predetermined time; and an amount-of-motion-picture-information calculating unit for summing the motion picture coding parameter and weight based on the variation of the motion picture coding parameter to calculate an ideal amount of motion picture information every predetermined time; and a network management apparatus for managing transmission of the motion picture code;

wherein an actual amount of motion picture information is calculated by multiplying the ideal amount of motion picture information by (1−the frame loss ratio);

wherein the motion picture code evaluation apparatus outputs the frame loss ration to the network management apparatus; and wherein at least one of screen size of the motion picture code, and the chrominance format of the motion picture code, the frame rate, the number of quantization levels is changeable in a transmission source of the motion picture code.

According to a seventh aspect of the invention, there is provided an accounting system comprising:

a motion picture code evaluation apparatus for evaluating an amount of motion picture information after transmission, the apparatus comprising:

a header inspection unit for inspecting a header and determining that whether the frame header is abnormal or not to calculate frame loss ratio every predetermined time;

an extracting unit for extracting motion picture coding parameter from the frame header and detecting variation of the motion picture coding parameter in the predetermined time; and an amount-of-motion-picture-information calculating unit for summing the motion picture coding parameter and weight based on the variation of the motion picture coding parameter to calculate an ideal amount of motion picture information every predetermined time; and an accounting apparatus for charging for motion picture transmission service wherein an actual amount of motion picture information is calculated by multiplying the ideal amount of motion picture information by (1−the frame loss ratio);

wherein the motion picture code evaluation apparatus outputs the actual amount of motion picture information to the accounting apparatus; and wherein the accounting apparatus charges based on quality of received motion picture.

BRIEF DESCRIPTION OF THE DRAWINGS

FIG. 1 is a block diagram showing a configuration of motion picture code evaluation apparatus according to an embodiment of the invention.

DETAILED DESCRIPTION OF THE PREFERRED EMBODIMENT

In the invention, an object to be described by the motion picture code is hierarchized. For instance, in the international standard such as MPEG-2, MPEG-4, H.261, H.263, and the like, while terms are different from each other, hierarchical structure thereof has, from the bottom layer, a pixel, a block including 8 pixels by 8 pixels, a macro block including 2 blocks by 2 blocks, a slice as a series of the macro blocks, a frame, a GOP including one or more frames, a sequence as a single stream representing a screen with succession of frames. However, the hierarchical structure of the invention is not limited to these standards.

The invention can be applied not only to the above international standards, but also to a motion picture code in which a header includes the screen size, the chrominance format, the frame rate, the number of the quantization level, and the like.

Next, embodiments of the invention will be described referring to the drawings.

FIG. 1 is a block diagram showing a configuration of motion picture code evaluation apparatus as an embodiment of the invention.

In FIG. 1, a motion picture code transmitter 11 is on the sending party and sends a motion picture code.

In the receiving party, there is provided a motion picture receiver 21 comprising a motion picture code receiver 22, a header inspection unit 23, a screen size extracting unit 24, a frame rate extracting unit 25, a number-of-quantization-level extracting unit 26, a motion picture code counter 27, an amount-of-motion-picture-information calculator 28.

The motion picture code receiver 22 receives a motion picture code sent from the motion picture transmitter 22. Further, the motion picture code receiver 22 outputs the received motion picture code to the motion picture code counter 27 and outputs a header of the received motion picture code to the header inspection unit 23, the screen size extracting unit 24, the frame rate extracting unit 25, the number-of-quantization-level extracting unit 26. The motion picture code receiver 22 may output the received motion picture code to an external motion picture decoder.

The motion picture code counter 27 counts an amount of codes of the motion picture code and outputs the counted amount of codes to the amount-of-motion-picture-information calculator 28 every predetermined time T.

The header inspection unit 23 inspects abnormality of the header.

The abnormality detected by the inspection are, for example, CRC check included in the header, abnormality in the header length, and the case where value exceeds a predetermined range.

When the header length is incorrect or a value in an incorrect range is obtained from the inputted header, a layer portion to which the inspected header belongs is deemed a loss.

For example, when the determined layer portion is the frame header, a frame is assumed as a loss.

When a time at which the header is inputted to the header inspection unit 23 is delayed in comparison with a display time code of the header, the header inspection unit 23 determines that a layer portion to which the header belongs is a loss.

When the header inspection unit 23 is inputted a frame header, the header inspection unit 23 outputs a frame header input signal to the amount-of-motion-picture-information calculator 28. When the frame header is determined abnormal, the header inspection unit 23 outputs a frame header abnormal determination signal to the amount-of-motion-picture-information calculator 28.

By counting the frame header input signal and the frame header abnormal determination signal for a predetermined time, the amount-of-motion-picture-information calculator 28 executes calculation of the frame loss ratio every predetermined time.

The screen size extracting unit 24 reads the screen size and the chrominance format of the motion picture from the inputted header to calculate the number of pixels of the frame and outputs the calculated number of the pixels to the amount-of-motion-picture-information calculator 28.

The screen size extracting unit 24 comprises a screen size extracting unit timer (not shown) for measuring time from a time when reading the screen size and the chrominance format from the inputted header to a time when reading a different screen size or a different chrominance format from another following header.

The screen size extracting unit 24 outputs the measured time up to reading the different screen size or the different chrominance format from another following header and reset the timer to start to measure a time up to reading the different screen size or the different chrominance format from other further following header.

In the above description, the screen size extracting unit 24 has the not-shown screen size extracting unit timer and measures the time from the time when reading the screen size and the chrominance format from the inputted header to the time when reading a different screen size or a different chrominance format from another following header. However, in place of the screen size extracting unit timer, the screen size extracting unit 24 may have the screen size extracting unit counter to measure number of the header from the time when reading the screen size and the chrominance format from the inputted header to the time when reading a different screen size or a different chrominance format from another following header.

A merit of using the screen size extracting unit counter is that number of headers, which have the same value in the screen size and the chrominance format included in the received header (frame), can accurately measured when the motion picture code is not received in real time and is received discontinuously in relation to actual time in burst like.

When measuring the time (the number of headers) from the time when reading the screen size and the chrominance format from the inputted header to the time when reading a different screen size or a different chrominance format from another following header with providing the screen size extracting unit 24 with the screen size extracting unit timer (screen size extracting unit counter), which is not shown, the screen size and the chrominance format extracted from the header determined abnormal by the header inspection unit 23 are ignored and the screen size and the chrominance format included in immediately preceding header is assumed to continue.

The frame rate extracting unit 25 reads the frame rate of the motion picture from the inputted header to outputs the read frame rate to the amount-of-motion-picture-information calculator 28.

The frame rate extracting unit 25 comprises a frame rate extracting unit timer (not shown) for measuring time from a time when reading the frame rate from the inputted header to a time when reading a different frame rate from another following header. When reading the different frame rate from another header, the timer outputs the measured time to the amount-of-motion-picture-information calculator 28.

When the frame rate extracting unit timer outputs the measured time to the amount-of-motion-picture-information calculator 28, the frame rate extracting unit timer is reset and then starts to measure again.

In the above description, the frame rate extracting unit 25 has the not-shown frame rate extracting unit timer and measures the time from the time when reading the frame rate from the inputted header to the time when reading a different frame size from another following header. However, in place of the frame rate extracting unit timer, the frame rate extracting unit 25 may have the frame rate extracting unit counter to measure number of the header from the time when reading the frame rate from the inputted header to the time when reading a different frame rate from another following header.

A merit of using the frame rate extracting unit counter is that number of headers, which have the same value in the frame rate included in the received header (frame), can accurately measured when the motion picture code is not received in real time and is received discontinuously in relation to actual time in burst like.

When measuring the time (the number of headers) from the time when reading the frame rate from the inputted header to the time when reading a different frame rate from another following header with providing the frame rate extracting unit 25 with the frame rate extracting unit timer (frame rate extracting unit counter), which is not shown, the frame rate extracted from the header determined abnormal by the header inspection unit 23 is ignored and the frame rate included in immediately preceding header is assumed to continue.

The number-of-quantization-level extracting unit 26 reads the number of quantization level from the inputted header to output the read number of quantization level to the amount-of-motion-picture-information calculator 28.

The number-of-quantization-level extracting unit 26 comprises a number-of-quantization-level extracting unit timer (not shown) for measuring time from a time when reading the number of quantization level from the inputted header to a time when reading a different number of quantization level from another following header.

The number-of-quantization-level extracting unit 26 outputs the measured time up to reading the different number of quantization level from another following header and reset the timer to start to measure a time up to reading the different number of quantization level from other further following header.

In the above description, the number-of-quantization-level extracting unit 26 has the not-shown number-of-quantization-level extracting unit timer and measures the time from the time when reading the number of quantization level from the inputted header to the time when reading different number of quantization level from another following header. However, in place of the number-of-quantization-level extracting unit timer, the number-of-quantization-level extracting unit 26 may have the number-of-quantization-level extracting unit counter to measure number of the header from the time when reading the number of quantization level from the inputted header to the time when reading different number of quantization level from another following header.

A merit of using the number-of-quantization-level extracting unit counter is that number of headers, which have the same value in the number of quantization level included in the received header (frame), can accurately measured when the motion picture code is not received in real time and is received discontinuously in relation to actual time in burst like.

When measuring the time (the number of headers) from the time when reading the number of quantization level from the inputted header to the time when reading different number of quantization level from another following header with providing the number-of-quantization-level extracting unit 26 with the number-of-quantization-level extracting unit timer (number-of-quantization-level extracting unit counter), which is not shown, the number of quantization level extracted from the header determined abnormal by the header inspection unit 23 is ignored and the number of quantization level included in immediately preceding header is assumed to continue.

Since a parameter concerning quantization of pixels, for example in MPEG-4, is not only set in a part of the frame header but also is set in a lower layer than the frame in detail (the number of quantization level is changeable in the same frame), when the number-of-quantization-level extracting unit 26 can read a header which belongs to a lower layer than the frame, the number of quantization level can be extracted accurately.

Incidentally, since, as described above, in order to evaluate the motion picture loss, it is sufficient to read the motion picture loss in an accuracy of several percents, if extraction is limited to a higher layer in accordance with necessity, the processing load can be further reduced.

Next, the description will be given on a process in the amount-of-motion-picture-information calculator 28.

The amount-of-motion-picture-information calculator 28 counts the frame header input signal and the frame header abnormal determination signal, which are inputted from the header inspection unit 23, respectively to calculates frame loss ratio every predetermined time T.

The amount-of-motion-picture-information calculator 28 assumes that there is no motion loss during the predetermined time T to calculate an ideal amount of motion picture information every predetermined time T from the pixels, the frame rate, and the number of quantization level, which are inputted from the screen size extracting unit 24, the frame rate extracting unit 25, and the number-of-quantization-level extracting unit 26, respectively. When the measured time (counted value) is inputted from any of the timers (counters) of the screen size extracting unit 24, the frame rate extracting unit 25, and the number-of-quantization-level extracting unit 26, the amount-of-motion-picture-information calculator 28 performs weighting to be in proportion to the measured time (counted value) and totally sum each of weighted values to calculate the ideal amount of motion picture information.

In the timer, value may be employed, which is converted in a time based on an ideal time when display time code is read from the frame header and the motion picture is displayed.

The conversion from the display time code into the actual time when the motion picture is displayed can be performed in most motion picture coding format.

For example, it is assumed that the display time code increases by 0.1 second in the actual time. When newly read value of the motion picture coding parameter is changed in relation to preceding value, if increase of the display time code of the frame header is 3, it can be calculated that continued time is 0.3 second.

As described above, in a case of receiving in burst like, when the frame rate is constant, it is easier to use the counter. When the frame rate is not constant, it is more accurate to calculate the continued actual time from the time converted from the timer with the display time code.

Which method is adopted is determined in view of required accuracy of the amount of motion picture information, cost for implementation, and the like.

For example, when the number of pixels varies during the predetermined time, the number of pixels, the frame rate, and the number of quantization level are P1, F1, and Q1, respectively during a measuring time t1, and the number of pixels, the frame rate, and the number of quantization level are P2, F1, and Q1, respectively during the remaining time t2 (the predetermined time T−the measuring time t1), the former ideal amount of motion picture information I1 is calculated by weighting with the measuring time t1, the latter ideal amount of motion picture information I2 is calculated by weighting with the remaining time t2, and the ideal amount of motion picture information I in the predetermined time T is calculated by summing I1 and I2.

Next, the amount-of-motion-picture-information calculator 28 multiples the ideal amount of motion picture information in the predetermined time T by (1−the frame loss ratio) to calculate an actual amount of motion picture information.

Including the case where the frame rate is varied, the actual amount of motion picture information may be calculated as below.

In the amount-of-motion-picture-information calculator 28, number of outputs of the frame header input signal and the frame header abnormal determination signal outputted from the header inspection unit 23 are calculated, respectively. A sum of the number of outputs the frame header input signal and the number of outputs of the frame header abnormal determination signal is calculated to be an actual number of frames.

From a time when the frame rate extracting unit 25 reads another frame rate different from frame rate read just before the another frame rate is read, in the amount-of-motion-picture-information calculator 28, a value which is obtained by multiple the frame rate by a predetermined time, that is, an ideal number of frames, which is number of frames in a case where no loss is present, is calculated. In the amount-of-motion-picture-information calculator 28, increased part of the actual number of frames in the predetermined time is also calculated to let difference between the ideal number of frames and the increased part of the actual number of frames be number of not-received frames.

A case where the increased part of the actual number of frames is less than the ideal number of frames corresponds to a situation where the frame header itself is not received. Therefore, in such a case, the frame loss ratio in the predetermined time is a value which is obtained by dividing the sum of the counted value of frame abnormal determination signal and the number of not-received frames by the ideal number of frames.

In the amount-of-motion-picture-information calculator 28, the actual amount of motion picture information is obtained by multiplying the ideal amount of motion picture information by (1−the frame loss ratio).

The amount-of-motion-picture-information calculator 28 may output the frame loss ratio to exterior.

Alternatively, when specification of the frame rate is not present in the codes, calculation may be performed as follows.

In the amount-of-motion-picture-information calculator 28, the amount of motion picture information may be taken for 0 with regard to the frame header which is determined abnormal by the header inspection unit 23 (in other words, the header inspection unit 23 outputs the frame header abnormal determination signal in relation to the frame header). In such a case, the header which is determined abnormal is not used for calculation.

In this case, the actual amount of motion picture information is the ideal amount of motion picture information as it is.

Because, compensation in relation to the frame loss already has been performed.

Alternatively, in the amount-of-motion-picture-information calculator 28, period from a time when the header inspection unit 23 outputs the frame header abnormal determination signal to a time when the header inspection unit 23 outputs the frame header input signal maybe calculated based on the timer as a loss time. Then, in the amount-of-motion-picture-information calculator 28, the ideal amount of motion picture information maybe calculated by using an actual duration as weight. The actual duration is obtained by subtracting the loss time from duration until the motion picture coding parameter is varied.

In this case, the actual amount of motion picture information is also the ideal amount of motion picture information.

Because compensation in relation to the frame loss already has been performed.

Which method is adopted is determined in view of required accuracy of the amount of motion picture information, cost for implementation, and the like.

The amount-of-motion-picture-information calculator 28 may output the actual amount of motion picture information to external.

The external, for example, may be a charging apparatus (may be reference numeral 100 shown in FIG. 1) and the charging apparatus may determine an amount of accounting for an user who is serviced the motion picture transmission on a basis of the inputted actual amount of motion picture information.

The amount-of-motion-picture-information calculator 28 may multiple the amount of codes inputted from the motion picture code counter 27 by (1−the frame loss ratio) every predetermined time T to calculate an actual amount of codes and output the calculated actual amount of codes to the external. In this case, the accounting for the user can be performed based on either the actual amount of motion picture information or the actual amount of codes.

The amount-of-motion-picture-information calculator 28 may output the frame loss ratio to an external network management apparatus.

The network management apparatus may change a motion picture coding parameter (such as the screen size, the chrominance format, the frame rate, the number of quantization level, and the like) of a motion picture coding apparatus (may be the reference numeral 100 shown in FIG. 1) disposed in a precedent stage of the motion picture code transmitter 11.

Therefore, appropriate motion picture coding parameter can be used in response to a situation of the network and the motion picture information can be transmitted more accurately.

Especially, in case the frame rate of the motion picture coding parameter (which includes the screen size, the chrominance format, the frame rate, the number of quantization levels, and the like) varies, weighting of the loss of a piece of frame varies. The loss amount is evaluated by weighting the time corresponding to a lost frame, not the number of lost frames, thus the loss amount can be evaluated more accurately.

This evaluation value is applied to a network management system to use this evaluation value in an operation and a management or is applied to an accounting system to establish a service accounting.

Incidentally, the invention may not comprise the motion picture code counter 27. In this case, the amount-of-motion-picture-information calculator 28 does not calculate the actual amount of codes.

Accordingly, since the motion picture code evaluation apparatus according to the invention reads the necessity portion for evaluating the motion picture code at any time, even if the number of pixels, the frame rate, and the number of quantization level vary in accordance with transmittion situation, the motion picture code evaluation apparatus can evaluate reception situation of the motion picture information accurately without decoding the motion picture code. Further more, since the motion picture code is not decoded, the invention can also reduce the process load.

What is claimed is:

1. A motion picture code evaluation apparatus for evaluating an amount of motion picture information after transmission, the apparatus comprising:

a header inspection unit for inspecting a frame header and determining that whether the frame header is abnormal or not to calculate frame loss ratio every predetermined time;

an extracting unit for extracting motion picture coding parameter from the frame header and detecting variation of the motion picture coding parameter in the predetermined time; and an amount-of-motion-picture-information calculating unit for summing the motion picture coding parameter and weight, which is based on the variation of the motion picture coding parameter, to calculate an ideal amount of motion picture information every predetermined time, wherein an actual amount of motion picture information is calculated by multiplying the ideal amount of motion picture information by (1−the frame loss ratio).

2. The apparatus according to claim 1, wherein the motion picture coding parameter includes number of pixels of motion picture, frame rate, and number of quantization levels; and wherein the extracting unit detects a ratio of frames in which each of the number of pixels, the frame rate, and the number of quantization levels continues to have the same value to the predetermined time.

3. The apparatus according to claim 2, wherein the number of pixels, the frame rate, and the number of quantization levels, which are included in the frame header determined abnormal, are ignored; and wherein the number of pixels, the frame rate, and the number of quantization levels, which are included in the frame header just before the abnormal frame header, are assumed to continue.

4. The apparatus according to claim 2, wherein the number of quantization levels is extracted while the number of quantization levels included in a header belonging to a lower layer than the frame is taken into consideration in addition to the number of quantization levels included in the frame header.

5. The apparatus according to claim 1, wherein the extracting unit has one of timer and counter, which is reset when the extracting unit extracts the parameter different from the parameter included in the immediately preceding frame header.

6. A motion picture transmission network system comprising:
- a motion picture code evaluation apparatus for evaluating an amount of motion picture information after transmission, the apparatus comprising:
  - a header inspection unit for inspecting a header and determining that whether the frame header is abnormal or not to calculate frame loss ratio every predetermined time;
  - an extracting unit for extracting motion picture coding parameter from the frame header and detecting variation of the motion picture coding parameter in the predetermined time; and
  - an amount-of-motion-picture-information calculating unit for summing the motion picture coding parameter and weight based on the variation of the motion picture coding parameter to calculate an ideal amount of motion picture information every predetermined time; and
- a network management apparatus for managing transmission of the motion picture code;
- wherein an actual amount of motion picture information is calculated by multiplying the ideal amount of motion picture information by (1−the frame loss ratio);
- wherein the motion picture code evaluation apparatus outputs the frame loss ration to the network management apparatus; and
- wherein at least one of screen size of the motion picture code, and the chrominance format of the motion picture code, the frame rate, the number of quantization levels is changeable in a transmission source of the motion picture code.

7. An accounting system comprising:
- a motion picture code evaluation apparatus for evaluating an amount of motion picture information after transmission, the apparatus comprising:
  - a header inspection unit for inspecting a header and determining that whether the frame header is abnormal or not to calculate frame loss ratio every predetermined time;
  - an extracting unit for extracting motion picture coding parameter from the frame header and detecting variation of the motion picture coding parameter in the predetermined time; and
  - an amount-of-motion-picture-information calculating unit for summing the motion picture coding parameter and weight based on the variation of the motion picture coding parameter to calculate an ideal amount of motion picture information every predetermined time; and
- an accounting apparatus for charging for motion picture transmission service
- wherein an actual amount of motion picture information is calculated by multiplying the ideal amount of motion picture information by (1−the frame loss ratio);
- wherein the motion picture code evaluation apparatus outputs the actual amount of motion picture information to the accounting apparatus; and
- wherein the accounting apparatus charges based on quality of received motion picture.

* * * * *